United States Patent [19]

Karageozian

[11] Patent Number: 5,579,201

[45] Date of Patent: Nov. 26, 1996

[54] MODIFIED ELECTRICAL STRIP FOR ENERGIZING/DE-ENERGIZING SECONDARY DEVICES SIMULTANEOUSLY WITH A MAIN DEVICE

[76] Inventor: Vicken H. Karageozian, 31021 Marbella Vista, San Juan Capistrano, Calif. 92675

[21] Appl. No.: 518,246

[22] Filed: Aug. 23, 1995

[51] Int. Cl.⁶ .............................. H02H 1/04; H02H 3/22
[52] U.S. Cl. ................................ 361/119; 361/91; 307/38
[58] Field of Search .................................. 361/56, 91, 93, 361/111, 115, 119; 307/36, 38, 39, 41, 52, 114, 115, 125, 126, 130, 132 E, 140; 364/492, DIG. 1, DIG. 2

[56] References Cited

U.S. PATENT DOCUMENTS

| | | | |
|---|---|---|---|
| 2,706,225 | 4/1955 | Freeman | 200/51.02 |
| 2,752,587 | 6/1956 | Naphtal et al. | 340/633 |
| 2,979,624 | 4/1961 | Askerneese | 307/38 |
| 2,988,655 | 6/1961 | Rudolph et al. | 307/114 |
| 3,161,738 | 12/1964 | Hall | 200/61.52 |
| 3,777,085 | 12/1973 | Horn | 200/51 LM |
| 4,675,537 | 6/1987 | Mione | 307/38 |
| 5,097,249 | 3/1992 | Yamamoto | 340/310 |
| 5,272,587 | 12/1993 | Wan | 361/111 |

Primary Examiner—Jeffrey A. Gaffin
Assistant Examiner—Ronald W. Leja
Attorney, Agent, or Firm—Stetina Brunda & Buyan

[57] ABSTRACT

An electrical power strip device generally including a) an elongate housing having at least one plug-receiving receptacle formed therein; b) a power supply cord extending from the housing and connectable to an electrical power source to deliver electrical current to said at least one plug receiving receptacle; c) a relay switch wired between said power supply cord and said at least one plug receiving receptacle such that, when said relay switch is closed power will flow from said power cord to said at least one plug receiving receptacle and when said relay switch is open power will not flow from said power cord to said at least one plug receiving receptacle; and, b) apparatus for communicating said relay switch to the primary device such that when the primary device is de-energized said relay switch will open so as to prevent power from reaching the secondary device(s) connected to said plug receiving receptacle(s) and when the primary device is energized the relay switch will close, thereby allowing electrical current from the power source to reach the secondary device(s) connected to the plug receiving receptacle(s) of the electrical power strip device.

8 Claims, 2 Drawing Sheets

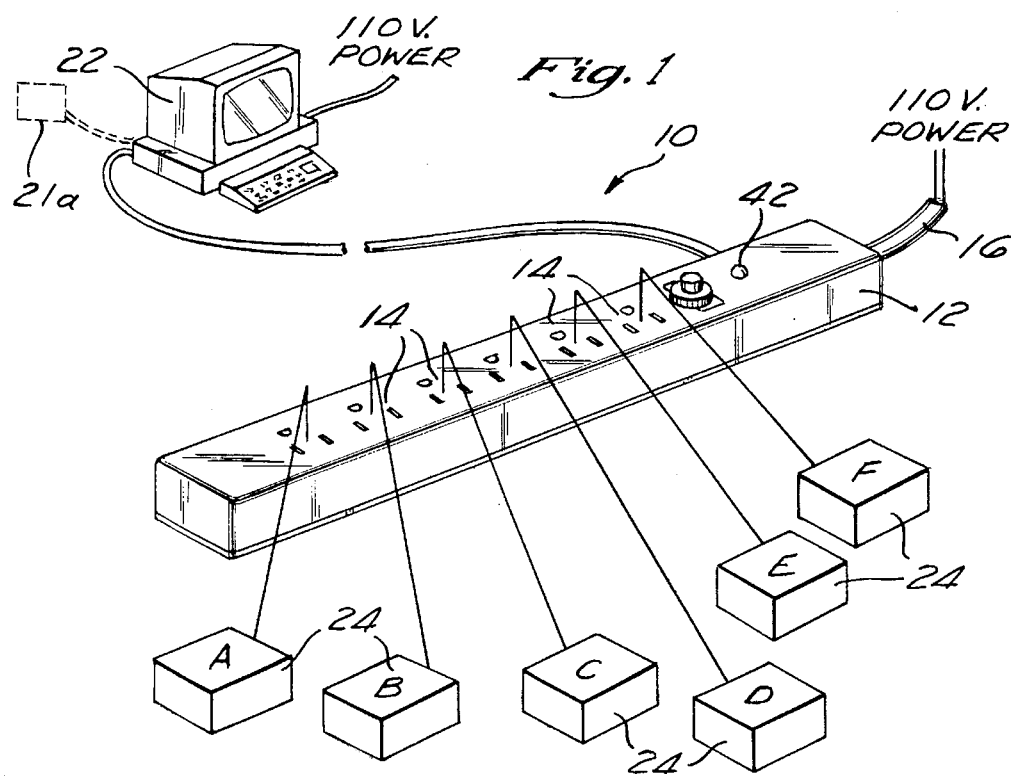
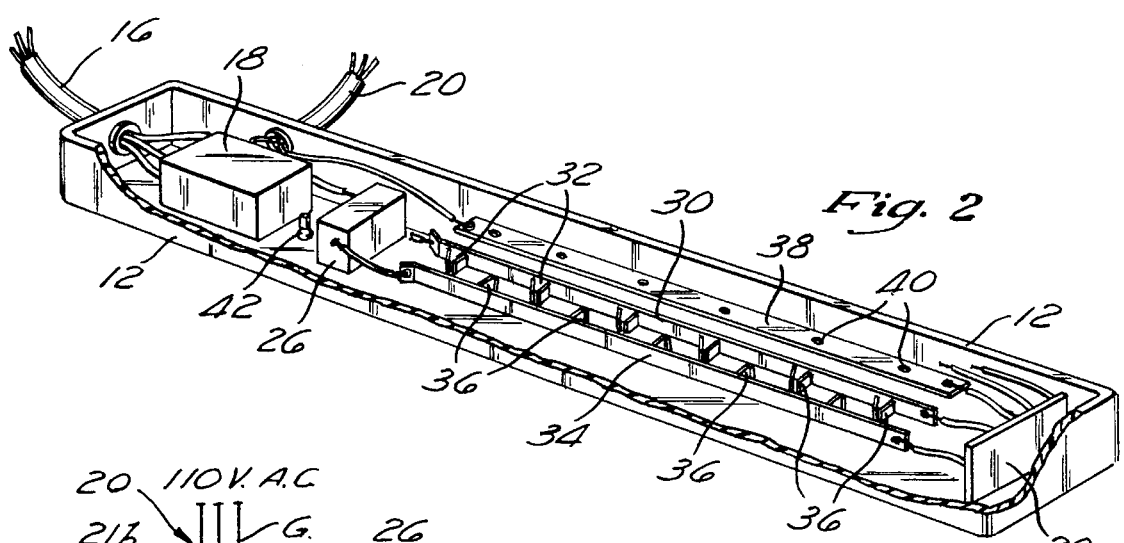
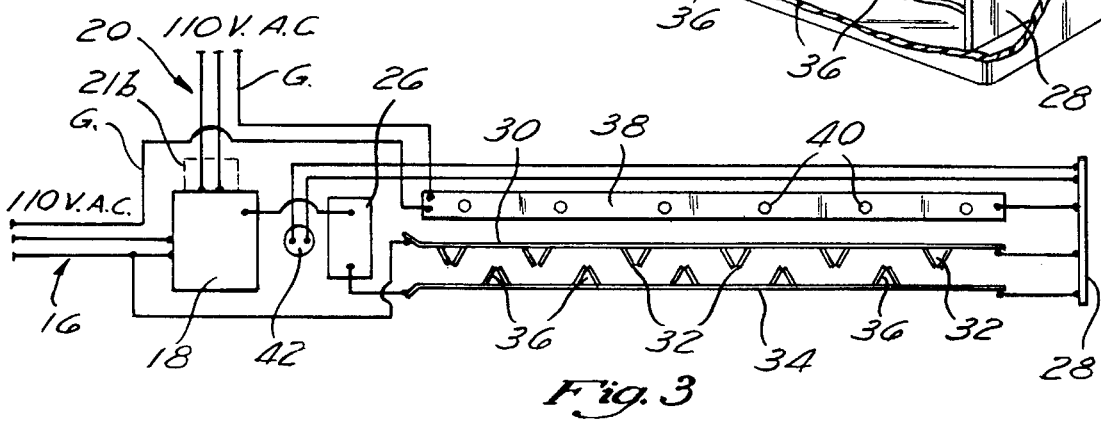

MODIFIED ELECTRICAL STRIP FOR ENERGIZING/DE-ENERGIZING SECONDARY DEVICES SIMULTANEOUSLY WITH A MAIN DEVICE

FIELD OF THE INVENTION

The present invention relates generally to electrical power delivery devices, and more particularly, to an electrical power strip which comprises a plurality of plug receiving receptacles formed in a housing, a power cord for providing electrical current to the plug receiving receptacles and a switch apparatus, said switch apparatus being communicative with a primary device such that, when the primary device is energized, the switch apparatus will close so as to allow current to flow from the power cord to the plug receiving receptacles.

BACKGROUND OF THE INVENTION

One type of electrical extension cord, commonly known as a power strip, generally comprises an elongate box-like housing having a row of plug-receiving receptacles formed therein, an on/off switch, and a single power cord which is connectable to a standard (e.g., nominal 110 volt) wall outlet. The power cord is typically plugged into the wall power outlet, to energize the power strip. Thereafter, a plurality of devices may be plugged into, the various plug receiving receptacles of the power strip. When the on/off switch of the power strip is turned to its "on" position, current will flow to the plug-receiving receptacles and any devices which are plugged into the power strip will become energized. Conversely, when the on/off switch is placed in its "off" position, devices which are plugged into the electrical power strip will become de-energized. Some of the electrical power strips of the prior art have included resetable circuit breakers and/or power surge protectors.

When using modern electrical devices and appliances, it is often desirable to cause a plurality of secondary devices to become energized and de-energized concurrently with a primary device. For example, when using a computer, it is sometimes desirable to energize/de-energize a group of secondary or peripheral devices concurrently with the computer. Examples of such secondary devices which may be powered externally of the computer include modems, monitors, printers, plotters, scanners, compact disk drives, hard disk drives, tape back-up drives, mice, digitizing tablets, etc.

In some instances, it has been common practice for the user of the computer to plug all of the desired secondary or peripheral devices into an electrical power strip of the above-described character such that, after the computer has been energized, the user may utilize the off/on switch of the power strip to simultaneously energize all of the computer peripheral devices which are plugged into the power strip. However, in many instances, the power strip must be located in an obscured position (e.g., on the floor behind or beneath an item of furniture) so as not to be easily accessible by the operator when it is desired to utilize the off/on switch of the power strip. In such cases, it may be necessary to leave the off/on switch of the power strip in the "on" position, and to laboriously turn each of the secondary or peripheral devices on an off independently, rather than utilizing the single on/off switch of the power strip to effect simultaneous energization and deenergization of the secondary devices.

In some types of primary devices (e.g., personal computers, stereo receivers/amplifiers) one or more power output jacks may be provided on the main device to permit one or more secondary or peripheral devices to be plugged directly into such power output jacks such that the secondary or peripheral device(s) become energized simultaneously with the main device. However, the current draw caused by some types of secondary or peripheral devices may result in over heating or overloading of the internal circuitry of the main device. Thus, in many instances, it is desirable to plug the secondary or peripheral devices into an independent electrical current source (e.g., a separate wall outlet) rather than plugging such secondary or peripheral devices directly into power output jacks formed in the main device. Electrical power strips of the foregoing character are frequently used for this purpose, but are subject to the limitations and difficulties of use described hereabove.

For numerous reasons, including technical considerations which may necessitate substantially simultaneous energization/de-energization of a plurality of secondary devices (e.g., computer peripheral devices) with a single primary device (e.g., a computer), there exists a need in the art for an improved electrical power strip which will automatically energize and de-energize plurality of devices which are plugged into the strip, upon receiving an electrical signal from the primary device, without the need for manual actuation of a switch on the electrical strip by the user.

SUMMARY OF THE INVENTION

The present invention generally comprises an electrical power strip device comprising a) a housing having at least one plug-receiving receptacle formed therein; b) a main power supply cord extending from the housing and connected to said at least one plug receiving receptacle to deliver electrical current thereto; c) a relay switch or other power-interrupting apparatus (e.g., any solid state or CPU based power-interrupting apparatus) connectable or otherwise communicable with a primary or main device (e.g., a computer or stereo receiver/amplifier) so as to sense whether the primary or main device is presently energized or de-energized, and to alternately a) permit electrical current to flow from the main power supply cord to the plug receiving receptacle(s) when the main device is energized and b) to prevent electrical current from flowing from the main power supply cord to the plug receiving receptacle(s) when the main device is de-energized. In this regard, the electrical power strip device of the present invention may be utilized to cause one or more secondary devices which are plugged into the plug receiving receptacle(s) to become energized and de-energized substantially simultaneously with a separate main device such as a computer or stereo receiver/amplifier.

Further in accordance with the present invention, the means by which the relay switch or other power-interrupting apparatus is connected to the main device may comprise a wire or power cord which is connectable to the main device, or any other suitable hard wired or wireless connection whereby a signal or other indication of the state 0f energization/de-energization of the main device may be received by the relay switch or other power-interrupting apparatus such that a) when the main device is energized the relay switch or other power interrupting apparatus will permit electrical current to flow to the power receiving receptacle(s), and b) when the main device is de-energized the relay switch or other power-interrupting apparatus will prevent electrical current from flowing to the plug receiving receptacle(s).

Further in accordance with the invention, the electrical power strip device may be configured and constructed for use with any line voltage or current level. In most applications, the electrical power strip device will be configured and constructed for use in connection with a standard wall outlet voltage such as the nominal 110 volt and nominal 220 volt wall outlets found in typical American homes. Other voltages or current levels may be utilized in other countries, or in commercial or industrial applications wherein atypical line voltages may be necessary or desirable.

Further in accordance with the invention, the device may further comprise a circuit breaker (e.g., a button-resetable circuit breaker) wired between said power cord and said at least one plug receiving-receptacle.

Still further in accordance with the invention, the device may further comprise a power surge protector apparatus (e.g., a power surge protector circuit board) connected to the device to prevent electrical power surges from being received by secondary device(s) connected to the plug receiving receptacle(s) of the electrical power strip device. Still further in accordance with the present invention, there is provided a method for causing at least one secondary device to become energized and de-energized substantially simultaneously with a primary device, through the use of the electrical power strip device of the present invention, as described generally hereabove. Broadly stated, the method comprises the steps of a) connecting the power cord of the device to a power source; b) connecting at least one secondary device to the at least one plug receiving receptacle of the power strip and c) communicating the relay switch of the power strip device to the primary device such that when the primary device is energized the relay switch will be open to prevent current from passing to the secondary device(s), and when the primary device is energized the relay switch will close so as to permit power to pass from the power cord, through the plug receiving receptacle(s) to the secondary device(s).

BRIEF DESCRIPTION OF THE DRAWINGS

FIG. 1 is a perspective view of an electrical power strip device of the present invention.

FIG. 2 is a partially cut-away perspective view of a portion of the power strip device shown in FIG. 1.

FIG. 3 is a general schematic diagram of the internal circuitry and components of the electrical power strip shown in FIG. 1.

DETAILED DESCRIPTION OF THE PREFERRED EMBODIMENTS

Figure 4:
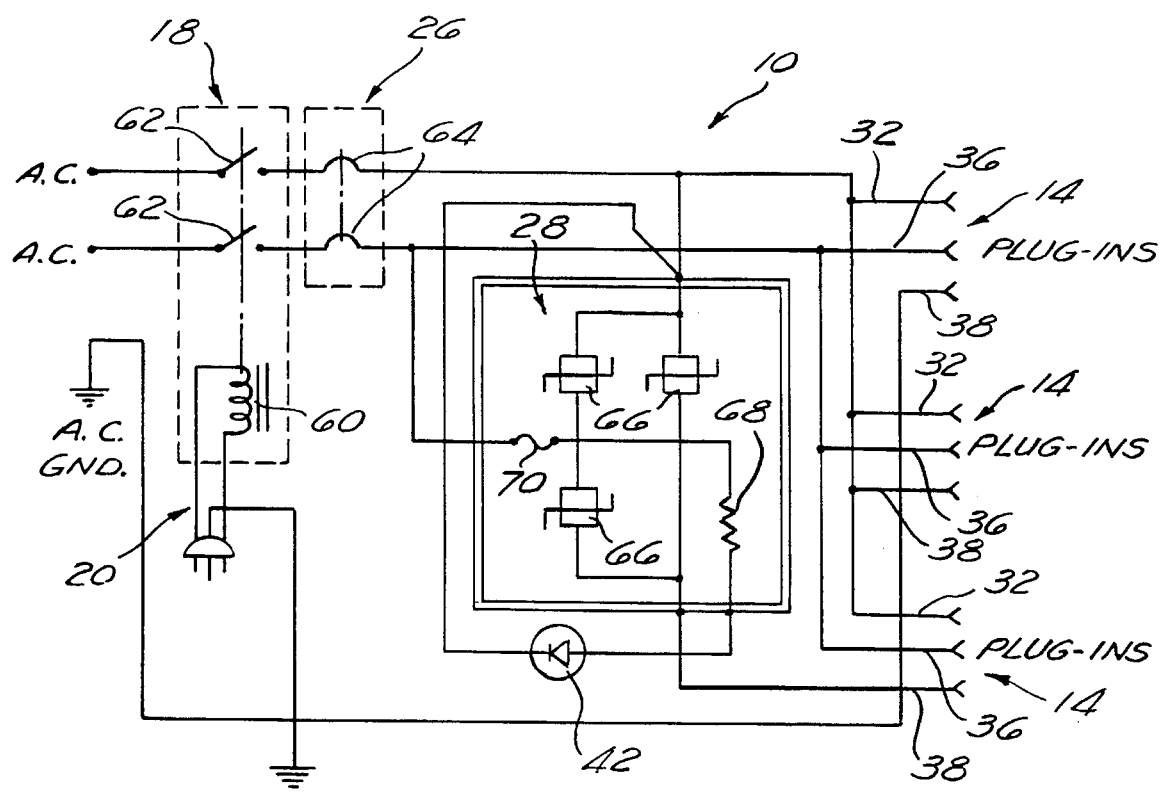
FIG. 4 is an electrical diagram of the presently preferred circuitry for an electrical power strip in accordance with the present invention.

The following detailed description and the following drawings are illustrative of but one presently preferred embodiment of the invention, and are not intended to describe all possible embodiments of the invention. Accordingly, the following detailed description and the accompanying drawings are not intended to limit the scope of the claims in any way.

With reference to the drawings, the preferred electrical power strip device 10 of the present invention comprises an elongate enclosure or housing 12 having an plurality of electrical plug-receiving receptacles 14 formed in a row on the upper surface thereof. A first power strip cord or main power cord 16 extends from one end of the housing 12. When the main power cord 16 is connected to a source of electrical current such as an electrical outlet (e.g., a standard wall outlet delivering nominal 110 volt or nominal 220 volt current), electrical energy will be passed through the main power cord 16 to the individual plug receiving receptacles 14 of the. electrical power strip device 10.

An electrically actuated relay switch 18 is mounted on or within the housing 12 and is connected to a second power strip cord or relay power input cord 20. The relay power input cord 20 extends from the housing 12, and is connectable to a primary or main device 22 such that when the primary or main device 22 is energized, power will pass from the primary or main device 22, through the relay input power cord 20, to the relay switch 18. The delivery of such electrical current to the relay switch will result in closing of the relay switch 18, thus allowing electrical power to flow from the main power cord 16 to the individual plug-receiving receptacles 14 of the device 10. In this regard, a plurality of secondary or peripheral devices 24 may be plugged into the individual plug receiving receptacles 14 of the device 10, and such secondary or peripheral devices 24 will become immediately energized upon closing of the relay switch 18.

In many embodiments of the invention, it will be desirable for the relay power input cord 20 to be provided with a plug which is insertable into a power output jack formed on the desired primary or main device 22. Such power output jacks are typical of primary or main device 22 such as personal computers or stereo receiver/amplifiers. In this regard, the relay power input cord 20 may be conveniently connected to the power output of the primary device 22 such that when the primary or main device 22 is energized, electrical current will promptly flow through the relay power input cord 20 to the electrical power strip device 10.

The relay switch 18 may comprise a standard single or double pole electrical relay switch device or any other solid state or CPU based device or apparatus capable of receiving input signal(s) indicative of the energization or de-energization of the main or primary device 22, and to alternately a) permit electrical current to flow from the main power cord 16 to the individual plug receiving receptacles 14 when the main device 22 is energized, and b) preventing electrical current from flowing from the main power cord 16 to the individual plug receiving receptacles 14 when the main device 22 is de-energized. The relay switch or other power interrupting apparatus 18 may be connected to the main device 22 by way of a wire such as the relay power input cord 20, or alternatively may in communication with the main device 22 by any other suitable means including wireless communication wherein a radio frequency emitter or transmitter 12a is connected to the main device 22 to emit or transmit a wireless radio signal when the main device 22 is energized, and an appropriate radio frequency receiver 21b is connected to the electrical power strip device 10 to receive the signal from the radio frequency transmitter of the main device 22, and to thereby cause the relay switch or other power interrupting apparatus 18 to alternately prevent power flow to the plug receiving receptacles 14 or permit power flow to such plug receiving receptacles 14, depending on the state of energization/de-energization of the main device 22.

An optional circuit breaker 26 may also be mounted within the housing 12, and connected to the outlet side of the relay switch 18, and such circuit breaker 26 may be set to disrupt the flow of current to the individual plug receiving receptacles 14 in the event that the flow of current exceeds a predetermined maximum amperage.

Also, an optional surge protector 28 may be mounted within the housing 12 and connected to the circuitry on the outlet side of the relay 18 so as to prevent the delivery of power surges to the secondary or peripheral devices 14 which are plugged into the plug receiving receptacles 14 of the device 10.

The individual plug receiving receptacles 14 of the device 10 may be constructed and configured in any suitable manner. One manner in which such plug receiving receptacles 14 may be configured is specifically shown in FIGS. 2 and 3. As shown, a first bar members 30 is connected to the positive side of the power cord 16 and is provided with a plurality of prong-contact-members 32 so as to engage and establish electrical contact with one prong of each plug inserted into the plug receiving receptacles 14. Similarly, a second bar member 34, having a plurality of second prong contacting members 36 formed thereon, is connected to the negative side of the power inlet cord 16.

A ground bar member 38 having a plurality of ground prong receiving detents or apertures 40 formed therein, is connected to the ground wires of power cord 16 and relay input cord 20, to permit grounding of the ground prongs of the plugs inserted into the individual plug receiving receptacles 14.

Also, in the embodiment shown, a power surge indicator light 42 is connected to the surge protector board 28, to provide a visual indication when a power surge of sufficient severity has resulted in actuation of the surge protector board 28.

FIG. 4 is a detailed electrical schematic diagram of the circuitry and preferred sub-elements of the components of the device 10 shown more generally in FIGS. 1–3. With reference to FIG. 4, the preferred electrically actuated relay switch 18 comprises a relay actuation coil 60 connected to relay power input cord 20 and a single or double relay switch 62 on the power cord 16 such that when current is received through relay power input cord 20, the coil 60 will cause the single or double relay switch 62 to close, thereby allowing electrical energy from 110 volt power cord 16 to pass through the device 10 to the plug receiving receptacles 14.

The optional circuit breaker 26 preferably comprises a single or double push button resetable circuit breaker 64, as shown.

The preferred surge protector circuit board 28 preferably comprises a i) series of diodes 66, such as those commercially available as part No. V130LA10A (General Electric Corporation) or equivalents thereof, a ¼ watt rated 47 k resistor 68 and ii) a fuse apparatus 70, such as a finely etched region on the PC board or other operable type of fuse apparatus 70.

It will be appreciated that the specific subassemblies and elements shown in the circuit diagram of FIG. 4 are merely examples of the manner in which the components and circuitry of the device 10 may be constructed, and various different sub-elements and circuit designs may be utilized to achieve the desired structure and function of the device 10.

It will be further appreciated that the primary and secondary devices to which the electrical power strip device 10 of the present invention is connected may comprise any desired types of apparatus or devices. For example, in typical usages, the primary device may be a computer and the secondary devices may include, but would not necessarily be limited to, modems, monitors, printers, plotters, scanners, impact disc drives, hard disc drives, tape back-up drives, mice, digitizing tablets and/or any other computer-related devices of a type which may be powered externally of the computer and which are desirably energized and de-energized in substantially simultaneous synchrony with the computer. As another example, the primary device may be a stereo receiver or amplifier, and the secondary devices may include, but would not necessarily be limited to, compact disc changers, cartridge tape decks, reel to reel tape decks, record players, or any other stereo-related components or apparatus of a type which may be powered by an electrical power source external of the stereo amplifier or receiver and which are desirably energized and de-energized in substantially simultaneous synchrony with the stereo receiver or amplifier.

Moreover, it is to be appreciated that the above-set-forth description and the accompanying drawings are directed to certain presently preferred embodiments of the invention only, and various additions, deletions and modifications may be made to the above-described embodiments without departing from the intended spirit and scope of the invention. Accordingly, it is intended that any and all such additions, deletions and modifications be included within the scope of the following claims.

What is claimed is:

1. An electrical power strip device for energizing and de-energizing at least one secondary device substantially simultaneously with the energization and de-energization of a primary device of the type having a power supply cord which is connectable to a first electrical power source and a power output jack which becomes energized and de-energized simultaneously with the energization and de-energization of said primary device via it's power supply cord, said power strip device comprising:

a housing having at least one plug-receiving receptacle formed therein;

a first power strip cord extending from the housing and connectable to a second electrical power source to deliver electrical current from said second electrical power source to said at least one plug-receiving receptacle;

a relay switch positioned within said housing, said relay switch being alternately positionable in a) an open position which prevents power from passing from said first power strip cord to said at least one plug-receiving receptacle, and b) a closed position which allows power to pass from said first power strip cord to said at least one plug-receiving receptacle;

a second power strip cord extending from the housing and connectable to the power output jack of the primary device and to said relay switch such that a) when the power output jack of the primary device is energized, power will pass through said second power strip cord to cause said relay switch to assume it's closed position, and b) when the power output receptacle of the primary device is de-energized, power will cease to flow through said second power strip cord, thereby causing said relay switch to assume it's open position.

2. The electrical power strip device of claim 1 further comprising:

a circuit breaker wired between said relay switch and said at least one plug receiving receptacle.

3. The electrical power strip device of claim 1 further comprising:

a power surge protector apparatus for preventing the transmission of power surges through said at least one plug receiving receptacle.

4. The electrical power strip device of claim 3 wherein said power surge protector apparatus comprises:

a surge protecting circuit board positioned within said housing and connected to said at least one plug receiving receptacle to prevent power surges from being delivered to at least one plug receiving receptacle.

5. An electrical power strip device for energizing and de-energizing at least one secondary device substantially simultaneously with the energization and de-energization of a primary device of the type having a power supply cord which is connectable to a first electrical power source and a power output jack which becomes energized and de-energized simultaneously with the energization and de-energization of said primary device via it's power supply cord, said power strip device comprising:

a housing having at least one plug-receiving receptacle formed therein;

a first power strip cord extending from the housing and connectable to a second electrical power source to deliver electrical current from said second electrical power source to said at least one plug-receiving receptacle;

a relay switch positioned within said housing, said relay switch being alternately positionable in a) an open position which prevents power from passing from said first power strip cord to said at least one plug-receiving receptacle, and b) a closed position which allows power to pass from said first power strip cord to said at least one plug-receiving receptacle;

a radio frequency transmitter which is connectable to the power output jack of the primary device to emit a radio signal when the power output jack of the primary device is energized; and, a radio frequency receiver connected to said relay switch, said radio frequency receiver being operative to receive said radio signal and to a) open said relay switch when no radio signal is received from said radio frequency transmitter, and b) close said relay switch when said radio signal is received from said radio frequency transmitter.

6. The electrical power strip device of claim 5 further comprising:

a circuit breaker wired between said relay switch and said at least one plug receiving receptacle.

7. The electrical power strip device of claim 5 further comprising:

a power surge protector apparatus for preventing the transmission of power surges through said at least one plug receiving receptacle.

8. The electrical power strip device of claim 7 wherein said power surge protector apparatus comprises:

a surge protecting circuit board positioned within said housing and connected to said at least one plug receiving receptacle to prevent power surges from being delivered to at least one plug receiving receptacle.

* * * * *